United States Patent [19]

Tzeng

[11] Patent Number: 6,067,574
[45] Date of Patent: May 23, 2000

[54] HIGH SPEED ROUTING USING COMPRESSED TREE PROCESS

[75] Inventor: Hong-Yi Tzeng, Tinton Falls, N.J.

[73] Assignee: Lucent Technologies Inc

[21] Appl. No.: 09/080,557

[22] Filed: May 18, 1998

Related U.S. Application Data

[60] Provisional application No. 60/074,169, Feb. 9, 1998.

[51] Int. Cl.[7] ................................................. G60F 15/16
[52] U.S. Cl. .......................... 709/247; 707/101; 709/238
[58] Field of Search ........................ 707/101, 3; 709/238, 709/230, 247

[56] References Cited

U.S. PATENT DOCUMENTS

| 5,268,686 | 12/1993 | Battail | 341/107 |
|---|---|---|---|
| 5,592,666 | 1/1997 | Perez | 707/102 |
| 5,737,732 | 4/1998 | Gibson et al. | 707/2 |
| 5,781,772 | 7/1998 | Wilkinson, III et al. | 707/102 |
| 5,864,859 | 1/1999 | Franaszek | 707/101 |
| 5,946,679 | 8/1999 | Ahuja et al. | 707/3 |

OTHER PUBLICATIONS

V. Fuller, T. Li, J.I. Yu, and K. Varadhan, "RFC 1519: Classless Inter–Domain Routing (CIDR): An Address Assignment and Aggregation Strategy," Sep., 1993.

G.R.Wright and W.R.Stevens, "TCP/IP Illustrated, vol. 2," Addison–Wesley Publishing Company, 1995.

M. Degermark, A. Brodnik, S. Carlsson, and S. Pink, "Small Forwarding Tables for Fast Routing Lookups," Proceedings of ACM SIGCOMM'97 Conference. 27(4): 3–14, Cannes, France, Sep. 14–18, 1997.

M. Waldvogel, G. Varghese, J. Turner, and B. Plattner, "Scalable High Speed IP Routing Lookups," Proceedings of ACM SIGCOMM'97 Conference. 27–(4): 25–35, Cannes, France, Sep. 14–18, 1997.

Shishibori et al., "An Efficient Compression Method for Patricia Tries", Dept. of Information Science & Intellegent Systems, The University of Tokushima. IEEE 1997, pp. 415–420.

*Primary Examiner*—Zarni Maung
*Assistant Examiner*—Bradley Edelman

[57] ABSTRACT

A router uses the destination address of its incoming packets to decide the proper outgoing interfaces by searching among all of the stored prefixes for the prefix which has the longest match when compared to the destination address in the packet. Prefix trees are employed to represent the set of prefixes to be searched and high-speed, longest prefix matches are performed. An efficient data structure compresses any prefix tree structure so that the number of memory accesses needed to find the longest prefix for any address depends only on the length of the prefix rather than on the number of stored prefixes. Illustratively, only four, 64-bit memory accesses are required to find the longest prefix match for each IPv4 address in the worst case, while only 3 Mbytes are required to store a 128K-entry routing table.

10 Claims, 4 Drawing Sheets

| | 0.20 (a) | 0.10 (b) | 0.20 (c) |
|---|---|---|---|
| 0.38 (d) | 0.01 (e) | 0.01 (f) | 0.10 (g) |

HIGH SPEED ROUTING USING COMPRESSED TREE PROCESS

This application claims the benefit of U.S. Provisional Application No. 60/074169 filed Feb. 9, 1998.

FIELD OF THE INVENTION

This invention relates to high speed packet routing and, more particularly, to tree structures for efficiently storing Internet Protocol ("IP") routing information.

BACKGROUND OF THE PRIOR ART

An essential task of a packet router is to find the outgoing interface for each incoming packet by querying a routing table. In a typical Internet backbone router the routing table include more than 30,000 entries. In the near future the number of entries is expected to increase by an order of magnitude. Even though the system may run at several gigbits per second, the overall throughput is restricted because of slow look-up speed and therefore routing table look-up would appear to be a performance bottleneck. Accordingly, it would be extremely advantageous to make IP routing table look-up operate at the speed of the backplane throughput, which is translatable into more than 4 million look-ups per second for a 2 Gbps backplane.

An IP routing table comprises a set of routes each of which determines the outgoing interface for a set of IP destination addresses, represented by an IP address and a subnet mask. In IP version 4, both the address and the subnet mask are 32-bit numbers. If the $K^{th}$ bit of the subnet mask is 1, it indicates that the $K^{th}$ bit of the corresponding IP address is significant, otherwise not. For example, if the IP address 12345678 and FFFFF000 (both are in hexadecimal format) define a route, the set of addresses between 12345000 and 12345FFF belongs to this route. Each subnet mask always consists of contiguous ones from the most significant bit to identify the bits of the IP address known as the "prefix" which defines the route. In the early days of the Internet, the IPv4 unicast addressing had only three different prefixes: 8, 16, and 24 bits. The Classless Inter-Domain Routing (CIDR) were introduced to allow prefixes with any lengths (See G. R. Wright and W. R. Stevens, "TCP/IP Illustrated, Volume 2," Addison-Wesley Publishing Company, 1995).

Upon receiving an IP packet, the router consults its routing table to determine the route (or outgoing interface) based on the packet's prefix bits which potentially may match multiple routes. The following procedure is taken to determine the route for this packet:

a) If there is a route that is a perfect match, this route is taken. A route is a perfect match if the IP address defining this route is identical to the IP destination address.

b) If there are some matches but no perfect match, the route with the longest match is taken. That is the route with the largest number of 1's in its subnet mask.

Several approaches have been proposed to support IP routing table look-up. As described in Wright & Stevens, supra, a special form of radix tree called a Patricia tree, (Practical Algorithm To Retrieve Information Coded in Alphanumeric), is used to represent the IP routing tables in both Net/3, FreeBSD and many existing high-end routers. The Patricia tree search algorithm supports any prefix length and can be used to search the longest matched prefix but may require backtracking during the search of an address, where backtracking means some nodes in the tree are visited more than once. The Patricia tree search algorithm may require about $h^2/2$ iterations per look-up in the worst case, where h is the height of the tree and can be as large as the address length (or 32 for IPv4 address)

A content addressable memory (CAM) which has multiple entries of IP addresses can be employed to cache the results of routing table look-up. Given an IP address, a CAM can search all of its entries in parallel. If there is a match after the search, a corresponding pointer to the matched address is obtained and is used to determine the output interface and some other information. Although a CAM is efficient in terms of its search speed, it is expensive and small in capacity as compared to a regular RAM. Moreover, since a CAM can only search on an entire address, it does not naturally support look-up with arbitrary prefix length. Without the assistance of other methods, a CAM supports only a small number of entries.

Another approach to speeding IP routing table look-up, which I call Hashed Radix Tree, is described in my co-pending patent application Ser. No. 09/003767 filed Jan. 7, 1998 in which the search, addition, and deletion times of a route are a function of the address length but are independent of the tree size. A typical look-up operation of the Hashed Radix Tree is described in FIG. 2. Each IP destination address is represented as 32-bit number, and is divided into two parts, the first K bits and the remaining (32-K) bits. The first K bits of the IP address are treated as an index to a RAM. Instead of putting all nodes into a single binary tree, the first K bits of IP address are hashed to a smaller tree in order to reduce the number iterations in the look-up. The output of the RAM is a pointer to the root node of a tree, denoted as the node labeled with "Bit K+1" in the figure. Each node in this tree has the same K-bit prefix as the first K bits of the IP address. If the $(K+1)^{th}$ bit of the IP address is 0, the look-up proceeds to the left child of the root node; otherwise, look-up proceeds to the right node of the root node. Similarly, in the next iteration, if the $(K+2)^{th}$ bit of the IP address is 0, the look-up proceeds to the left child node of the node labeled with "Bit K+2"; otherwise, look-up proceeds to the right node of the node labeled with "Bit K+2." The look-up process continues in like fashion by examining bit (K+3), . . . , 32 to determine whether to take the left or right child in each iteration. The look-up process stops when it finds a perfect match or reaches a node without any child node.

Figure 1:
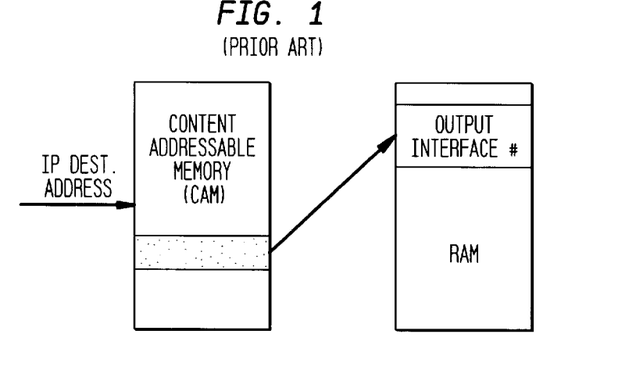
FIG. 1 depicts a prior art content addressable memory used for looking up Internet Protocol routing information.
Figure 2:
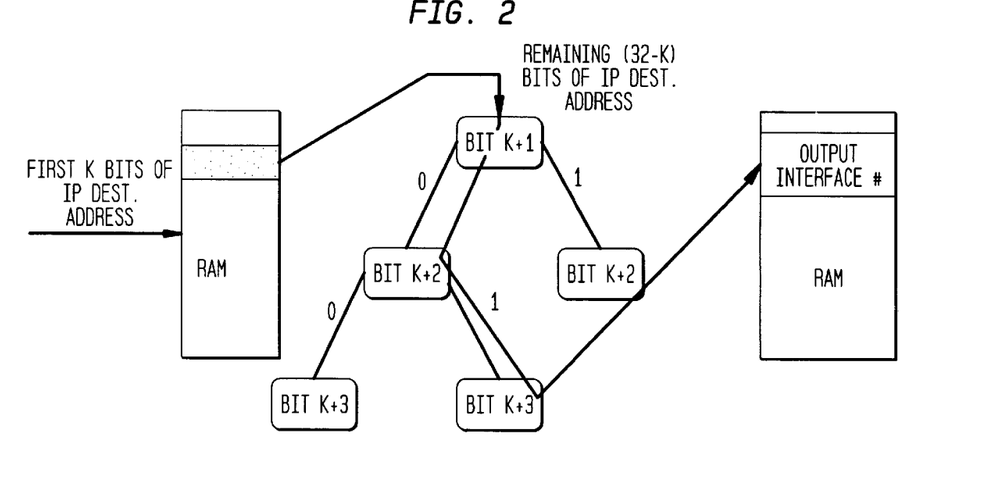
FIG. 2 depicts a hashed radix tree for Internet Protocol routing look-up.

If a perfect match is found (as indicated in FIG. 2 at the node labeled with "Bit K+3"), a pointer is obtained to a separate memory to determine the output interface corresponding to this IP destination address. During the look-up process, several matches with various subnet masks may be found. The process will always keep the best match that it has found. When the look-up process reaches a node without any child node, the best match will be used as if it is the perfect match, and the output interface corresponding to this IP address can be determined. If there is no match at all during the look-up process, the look-up decides that there is no route entry for this IP address. Hardware implementation of the Hashed Radix Tree look-up is easy because (a) only about (33-K) iterations per look-up are required in the worst case; (b) both subnet mask look-up and maximum matching are supported and (c) search time is independent of the number of route entries, so a large number of routes can be supported.

Another approach which can support a prefix of arbitrary length is disclosed by Degermark et al in an article entitled "Small Forwarding Tables for Fast Routing Look-ups," Proceedings of ACM SIGCOMM'97 Conference. 27(4):

3–14, Cannes, France, Sep. 14–18, 1997. This a hierarchical encoding scheme to compress a routing table. The address space is partitioned into three levels, one level deals with the first 16 bits, another bits 17 to 23, and the last level is concerned with the last 8 bits. Each level uses a separate encoding scheme to compress the tree structure. The Degermark scheme focused on the number of memory accesses required during look-up, and the size of the data structure. In particular, their algorithm requires about 150–160 Kbytes to represent a table with 40,000 routes. Using a general-purpose processor, a typical search requires eight references to memory and accesses a total of 14 bytes. Since the table is reasonably small, it can fit into the data cache of a high-end processor and so search time is very short. However, insertion and deletion of route entries in the compacted table may incur the change of the entire table and so incremental changes to the table are not feasible.

Still another approach is disclosed by Waldvogel et al in an article entitled "Scalable High Speed IP Routing Look-ups", Proceedings of ACM SIGCOMM'97 Conference, 27(4):25–35, Cannes, FR, Sep. 14–18, 1997 which uses binary search on hash tables organized by the prefix lengths and which scales very well as address and routing table sizes increase. In particular, it requires a worst case time of $\log_2$ (address bits) hash look-ups, independent of the table size. Instead of searching from the longest prefixes or the shortest prefixes, the Waldvogel scheme starts the search at the prefixes of median length, say M. If there is a match at the median length, a subsequent search should be performed at the prefixes of the median length between the longest prefix length and M; otherwise, it should be performed at the prefixes of the median length between the smallest prefix length and M. Then, the search continues on different prefix lengths as if traversing a binary tree. The number of prefix lengths to be considered is reduced by half after each hash look-up. If proper hashing functions are employed and the computation of the hash functions can be accomplished efficiently, it is easy to show that if the organization of these prefix lengths is balanced, we have the worst case time complexity. As pointed out by the authors, insertion and deletion of route entries in the hash tables (while maintaining the proposed search time) may require that the major part of the tables be changed. So additional work is required to support incremental change to the tables. Since hashing functions tend to waste some memory if a non-perfect hashing function is employed, the Waldvogel approach requires more memory than other previous approaches. The cost to compute the hashing function is also an important issue to consider.

Given a set of prefixes, many existing search algorithms use some tree structure to represent these prefixes. A tree representation of prefixes enables efficient search, insertion, and deletion of any prefix in the set of prefixes. Both Patricia trees and Hashed Radix trees use a tree structure in which a prefix is not always expanded, but in which prefix information can be obtained in either leaf nodes (in Patricia Tree) or in all nodes (in Hashed Radix Tree). These approaches require additional memory access to obtain the prefix values of routes either at leaf nodes (in Patricia Tree) or in all nodes (in Hashed Radix Tree).

SUMMARY OF THE INVENTION

In accordance with the principles of the invention, as illustrated in an exemplary embodiment, a tree of Internet Protocol address prefixes is represented by a condensed array of memory pages containing strings of codes identifying tree nodes rather than an array of prefixes themselves. A page, or subtree, is constructed by making an ordered selection of the codes beginning at the root node of the tree and continuing until the page is filled or until all of the nodes of the tree have been included. The codes identify whether a node (a) represents a valid prefix; (b) has descendent nodes; and (c) whether its descendent nodes correspond to a one or to a zero of the prefix. Each page is associated with a pointer, NextPagePtr(p), to a succeeding page rooted at a descendent of its egress node (a node, if any, which has at least one descendent node rooted in a subsidiary subtree), and another pointer, NextHopPtr(p), to a location where routing information corresponding to a valid prefix is stored. The pointer NextPagePtr(p) is incremented according to the number of descendents of the subtree's egress node. The NextHopPtr(p) pointer is incremented according the number of valid prefixes in the subtree. The compressed prefix tree structure reduces the number of memory accesses needed to find the longest prefix for any address so that it depends only on the length of the prefix rather than on the number of stored prefixes. Illustratively, only four, 64-bit memory accesses are required to find the longest prefix match for each IPv4 address in the worst case, while only 3 Mbytes are required to store a 128K-entry routing table.

BRIEF DESCRIPTION OF THE DRAWINGS

The foregoing features may be better understood when the ensuing description is read together with the drawing, in which.

GENERAL DESCRIPTION

Prefix Tree Representation

Figure 3:
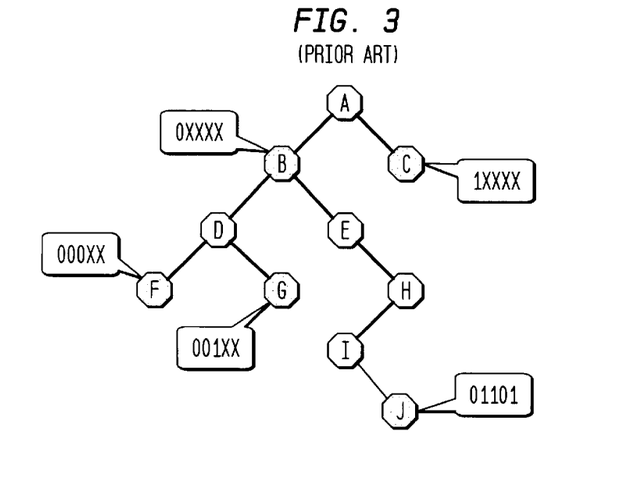
FIG. 3 illustrates a prefix tree representing Internet Protocol prefix nodes.

We shall define a prefix tree structure to represent a set of prefixes. The nodes of a prefix tree are arranged similarly to the method employed by the Hashed Radix Tree. However, in a prefix tree, the prefix information is not stored in any node of the tree structure, but is embedded inside the tree structure itself. In particular, a prefix is stored as a path from the root node of the tree to either an internal node or a leaf node, where the left and the right descendents of a node are identified as 0 and 1, respectively. For example, FIG. 3 illustrates a prefix tree representing the set of prefixes: 000XX, 001XX, 1XXXX, 0XXXX, and 01101, where X denotes "don't care." A path from the root node to any node with gray color indicates a prefix stored in the tree. This convention is used in all figs. For example, the path ABDG represents the prefix 001XX, and the path AB represents the prefix 0XXXX. It is clear that a prefix tree of depth (h+1) can represent any set of h-bit prefixes. Since each prefix is embedded in the prefix tree as a path, each node would normally have to contain pointers to its descendents. It would be advantageous to reduce the memory requirement of the prefix tree representation by removing the need for such pointers. In the section entitled Prefix Tree Compression I introduce a technique to remove these pointers and which allows very compact representation of any prefix tree.

Searching Prefix Trees

Given a set of prefixes, one can construct a prefix tree based on the discussion in the previous section. Using a prefix tree, the longest prefix match of any string can efficiently be found. For example, consider a 5-bit string $S_1=11011$ and the prefix tree in FIG. 3. Since the first bit of $S_1$ is 1, we take the right branch (node C) of the node A. Since node C is a leaf node, we conclude that the longest prefix match of $S_1$ is C=1XXXX. Consider another 5-bit string $S_2=00110$. Since the first bit of $S_2$ is 0, we take the left branch (node B) of the node A. Node B is shaded to indicate that node B stores route information for the prefix 0XXXX of $S_2$. Since the second bit of $S_2$ is also 0, we take the left branch (node D) of the node B. Since the third bit of $S_2$ is 1, we take the right branch (node G) of the node D. Since the node G is a leaf node, we conclude that the longest prefix match of $S_2$ is G=001XX, which is a better match than 0XXXX.

Prefix Tree Compression

FIG. 3 is a conceptual representation of a prefix tree structure. A typical, conventional implementation of a tree structure would use a collective data structure to represent a node, which would include some key values associated with the node itself and some pointers to the descendents of the node. Traversing a tree structure like FIG. 3 requires reading each node's information before a branching decision can be made. In the example described, the information of 4 nodes (nodes A, B, D, and E) would have to be accessed in order to traverse from the root node A to the node H. A set of compression techniques will be described to reduce both the memory requirement of a prefix tree representation and the number of memory accesses to perform a search.

Compressing Small Trees

Figure 4:
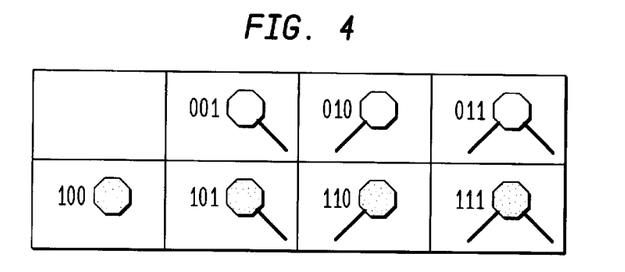
FIG. 4 illustrates the seven possible ways a single node subtree can be constructed and identified by a unique coding scheme.

Instead of representing each node with collective data, one can assign a unique number to each tree which has a different topology. For example, FIG. 4 illustrates one method in which a number is assigned to a node which has at most two descendents. As shown, each node can either represent a valid prefix (gray color) or not (in white color). By the definition of a tree, a node without leaf node is a leaf node of the tree.

Compressing General Trees

A tree can be partitioned into multiple small trees. For example, one can partition the tree T in FIG. 3 into ten subtrees and each subtree contains exactly one node. Since the depth of each small tree is at most one, we can assign a number to each subtree based on the depth-1 numbering shown in FIG. 4. Given the numbering for all ten subtrees, one can assign a unique number to the tree T with one of the following (among many feasible methods, not limited to these methods):

In-Order, Depth-First (IODF) Numbering: The tree, T, is assigned a number by traversing the small trees in an In-order, Depth-first fashion, that is: A, B, D, F, G, E, H, I, J, and then C. Using the depth-1 tree numbering of FIG. 4, one can concatenate the corresponding number of each small tree to obtain the corresponding number for the tree T, that is 011-111-011-100-100-001-010-001-100-100, remembering that the right branch corresponds to 1. (The string has been hyphenated to increase readability).

In-Order, Breadth-First (IOBF) Numbering: The tree T is assigned a number by traversing the small trees in an In-order, Depth-first fashion, that is A, B, C, D, E, F, G, H, I, and then J. Using the depth-1 tree numbering of FIG. 4, one can concatenate the corresponding number of each small tree to obtain the corresponding number for the tree T, that is 011-111-100-011-001-100-100-010-001-100.

It is easy to show that no two trees share the same numbers, given either one of the above numbering methods. Using the above method with the depth-1 tree numbering method described in FIG. 4, 3N bits are needed to represent any tree of N nodes.

Using Pages to Compress General Trees

Let T denote the bit string representing a prefix tree structure T, and S denote a bit string to be searched. Since the string T uniquely represents a prefix tree, one can reconstruct the prefix tree structure based on T. The longest prefix match of S can be conceptually performed on the string T as on a non-compressed prefix tree counterpart of T, but the amount of memory access and search time may be excessive.

To compress any prefix tree T such that each search requires a small number of memory accesses, let T denote the bit string representing T. We shall arrange the bit string T as pages p of a fixed size, says P bits. We use String(p) to denote the P-bit binary string associated with the page p. Each page also has two pointers: one pointer NextPagePtr(p) to the first page rooted at the descendents of this page's egress nodes, and another pointer NextHopPtr(p) to the next-hop information corresponding to the first valid prefix stored in this page. To simplify our discussion, we assume the next-hop information associated with each valid prefix is the prefix value itself, although the actual information stored in a router should be the next-hop address and outgoing interface instead. The following algorithm can be employed to compress any prefix tree that uses any numbering mechanism (such as the depth 1 numbering scheme) to represent subtrees of T.

Let an egress node of a subtree denote a node that has at least one descendent in the original prefix tree and that this descendent is outside of this subtree. Let P denotes an array of pages, and R denotes an array of next-hop information associated with these prefixes. Let $P_i$ and $R_j$ denote the $i^{th}$ and $j^{th}$ elements of P and R, respectively. Using the first page $P_0$, we employ the in-order, breadth-first numbering to compress a subtree rooted at the root node of T until either no space left in this page or all nodes in T has been included into String($P_1$). It is easy to show that String($P_1$) corresponds to a subtree rooted at the root node of T. Let NextHopPtr($P_1$) equal to 0. During the construction of String($P_1$), we also store the next-hop information associated with each valid prefix (corresponding to a node in gray color) to the array R in the in-order breadth-first fashion, starting at the first element $R_0$. Let NextPagePtr($P_1$) equal to 1.

Let $D_1=\{d_0, d_1, \ldots\}$ denote an ordered set of the descendents of the egress nodes of $P_1$ in the in-order, breadth-first order. For each descendent $d_i$, we use a page $P_{i+1}$, and similarly use String($P_{i+1}$) to compress a subtree rooted at $d_i$ until either no space is left in this page, or all nodes rooted at $d_i$ have been included into String($P_{i+1}$), where the value '1' is equal to the pointer NextPagePtr($P_1$). It is easy to show that String($P_{i+1}$) corresponds to a subtree rooted at $d_i$ since we start the compression at the node di and employ the in-order, breadth-first numbering. The pointer NextHopPtr($P_{i+1}$) is set to NextHopPtr($P_i$) plus the number of valid prefixes in $P_i$. The pointer NextPagePtr($P_{i+1}$) is set to NextPagePtr($P_i$) plus the number of descendents of the egress nodes in $P_i$. By recursively applying the above scheme, one can compress the entire tree T and obtain the corresponding tree structure.

Figure 5:
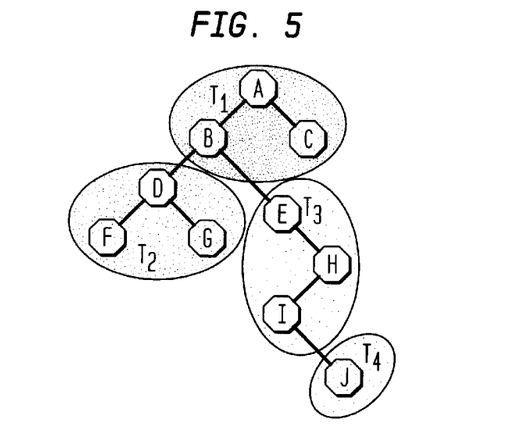
FIG. 5 shows a prefix tree partitioned into subtrees comprising an ordered selection of nodes.

For example, suppose each page has 9-bit storage and use the depth-1 number. It follows from the definition of the depth-1 numbering that each node in the prefix tree requires 3 bits of storage. Therefore, each page can store at most a subtree with at most 3 nodes. Using at most 3 nodes in each partition (or page), FIG. 5 illustrates the partition of a typical prefix tree if we employ the in-order breadth-first numbering.

We first pick the first page $P_0$ and then compress the tree T starting at the root node A. We have String($P_0$)=011-111-100, corresponding to subtree $T_1$. Let NextHopPtr($P_0$) and NextPagePtr($P_0$) be equal to 0 and 1, respectively. Since both nodes B and C are valid prefixes, we store the corresponding information into R in the in-order breath-first order. Therefore $R_0$ and $R_1$ are set to the prefixes 0XXXX and 1XXXX, respectively.

Node B is the only egress node in the subtree $T_1$, and it has two descendents D and E. Based on the breadth-first numbering, we then consider the node D. We pick the next page $P_1$ and then compress the subtree rooted at node D, and have String($P_1$)=011-100-100, corresponding to subtree $T_2$. Since there are two descendents in $T_1$ and NextPagePtr($P_0$) is equal to 1, the pointer NextPagePtr($P_1$) is equal to 3. Since there are two valid prefixes in $T_1$ and NextHopPtr($P_0$) is equal to 0, the pointer NextHopPtr($P_1$) is equal to 2. Since both nodes F and G are valid prefixes, we store the corresponding information into R in the in-order breath-first order. Therefore $R_2$ and $R_3$ are set to the prefixes 000XX and 001XX, respectively.

Now consider the node E. We pick the next page $P_2$ and compress the subtree rooted at node E. We have String($P_2$)=001-010-001, corresponding to subtree $T_3$. Since there are no descendent in $T_2$ and NextPagePtr($P_1$) is equal to 3, the pointer NextPagePtr($P_2$) is equal to 3. Since there are two valid prefixes in $T_2$ and NextHopPtr($P_1$) is equal to 2, the pointer NextHopPtr($P_2$) is equal to 4. Here we do not add prefixes into R since there is no valid prefix in $T_3$.

The node I is an egress node in $T_3$, and the node J is the only descendent of I. We pick the next page $P_3$ and compress the subtree rooted at J. We have String($P_3$)=100-XXX-XXX, corresponding to $T_4$, where 100-XXX-XXX denote any 9-bit string whose prefix is 100. Since there is one descendent in $T_3$ and NextPagePtr($P_2$) is equal to 3, the pointer NextPagePtr($P_3$) is equal to 4. Since there is no valid prefix in $T_3$ and NextHopPtr($P_2$) is equal to 4, the pointer NextHopPtr($P_3$) is equal to 4. Since the node J corresponds to a valid prefix, we store the corresponding information into the next available entry in R. Therefore $R_4$ is set to the prefix 01101.

Figure 6:
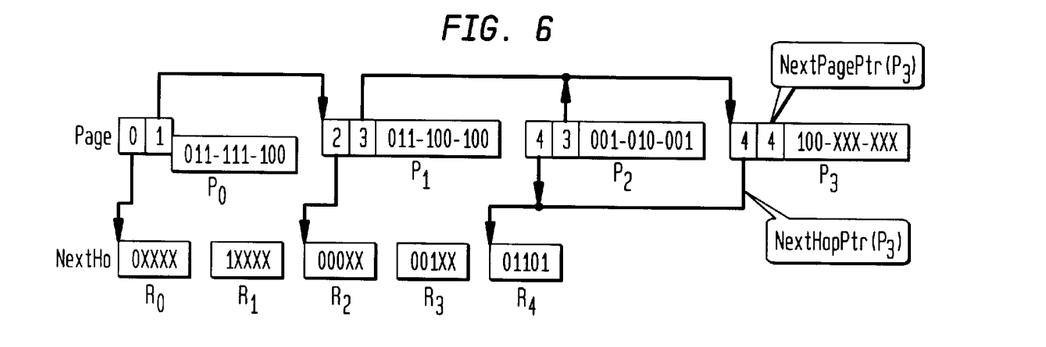
FIG. 6 illustrates the condensed pages of memory storing the subtrees of FIG. 5.

By now we have visited all nodes in the prefix tree T and constructed the corresponding compressed prefix tree T. The result is illustrated in FIG. 6.

The compression algorithm is formally described as follows. Let C denote a temporary variable used by the algorithm to store an ordered set of candidate root nodes used to construct subtrees.

Prefix Tree Compression Algorithm:
Input:
T: the prefix tree to be compressed;
P: array of fixed size pages;
R: array of prefixes;
Output:
P and R: the compressed prefix tree;
Step 1. Initialization:
C:={the root node of T};
i:=0;
Step 2. Check Termination Condition
If C is empty then
    Return P and R as the representation of T and then stop;
Else
    Continue to Step 3;
Step 3. Compress a Subtree:
A. r:=the first node of C; Remove the first node from C;
B. Use String($P_i$) to store the compressed subtree rooted at r using in-order breadth-first numbering until either no space left in this page, or all nodes rooted at r in T has been included;
C. Add all valid prefixes in $P_i$ to the array R in the in-order breath-first order;
D. C:=concatenate C and the set of descendents of the egress nodes in $P_i$ in the in-order breadth-first order;
E. if i=0, NextPagePtr($P_i$):=1 and NextHopPtr($P_{i-1}$):=0;
F. if i>0, NextPagePtr($P_i$):=NextPagePtr($P_{i-1}$)+the number of descendents of the subtree $P_{i-1}$'s egress nodes;
G. if i>0, NextHopPtr($P_i$):=NextHopPtr($P_{i-1}$)+the number of valid prefixes in the subtree corresponding to $P_{i-1}$;
H. i:=i+1;
Step 3. Repeat Step 2.

3. Search Using Compressed Prefix Trees

Suppose the compression technique introduced above is employed to represent any prefix tree T by arrays of pages P and prefixes R. Given a key K, we shall describe how to find the longest prefix match on the compressed tree (P, R) as follows. The first page $P_0$ of P can be employed to reconstruct the corresponding subtree $T_1$. Then, a search can be performed on $T_1$ as if on the original prefix tree. Using the method described above under "Searching Prefix Trees", we have the following cases at the end of the search on $T_1$:

1. Reach a leaf node and find no match with any node in $T_1$,
2. Reach a leaf node and match the prefix associated with some gray node in $T_1$,
3. Reach an egress node and find no match with any node in $T_1$, or
4. Reach an egress node and match the prefix associated with some gray node in $T_1$.

If the search result is either case 1 or 2, we check whether there is at least one match during the above search process. If there is a match during the search, the last match is the longest match; otherwise, there is no match. On the other hand, if the search result is either case 3 or 4, this egress node may contain more than one different descendents. Suppose the egress node match the $k^{th}$ bit of the key K. The $(k+1)^{th}$ bit of K is employed to determine the corresponding descendent node d if there is any. If the corresponding descendent does not exist, the last matched node is the longest match. Otherwise, suppose the node d is $P_1$'s $k^{th}$ descendents. It can be shown that the page $P_j$ is rooted at node d, where j=NextHopPtr($P_1$)+k. Then, we continue the search by retrieving the page $P_j$, and then repeat the search on the page $P_j$ until reaching either case 1 or 2.

Suppose the longest match is at the $i^{th}$ valid prefix of the page $P_j$. The information associated with this prefix is stored at the $\{NextHopPtr(P_j)+i-1\}^{th}$ at entry of the array R.

Summary of Operations

Figure 7:
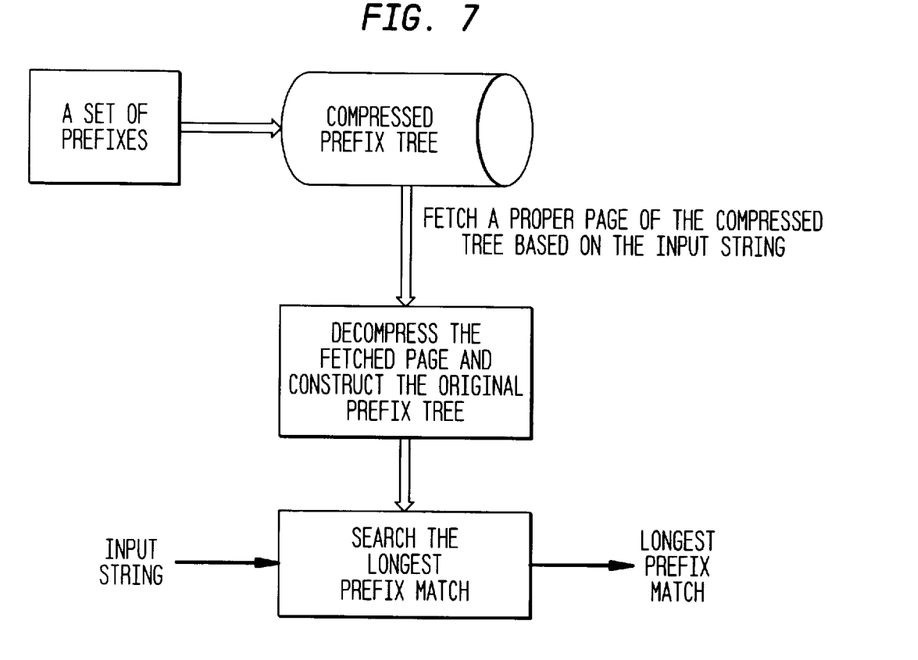
FIG. 7 is a schematic diagram of the method of forming and searching a compressed prefix tree.

A prefix tree described above can be employed to support efficient search of the longest prefix match given any input string. The compression technique described above can be used to reduce the memory requirement of a prefix tree representation. Using a compression technique, one can traverse the compressed prefix tree rapidly, and the number of memory access to retrieve relevant information is relatively small, comparing to a naive approach using pointers to represent a tree structure. FIG. 7 illustrates these operations.

Analysis

We shall discuss the memory requirement and time complexity of the proposed algorithm. We shall also present a specific algorithm to perform longest prefix match for IPv4 addresses. We will also show that the depth-1 numbering is optimal for small trees, and almost optimal for a large tree.

Memory and Time Complexity

We shall consider the time complexity to construct the compressed prefix tree. Given a set of N prefixes, whose lengths are at most H bits, we first consider the time to construct a non-compressed prefix tree. It is easy to show that it requires O(H) operations to add each prefix into the prefix tree. So, it requires O(N×H) time complexity to add all N prefixes to build the corresponding prefix tree. It is also easy to show that the prefix tree consists of at most N×H nodes, since many prefixes share some common prefixes. According to the "Prefix Tree Compression Algorithm," every node in the prefix tree is examined O(1) times. Thus, given a non-compressed prefix tree, it requires O(N×H) time complexity to compress the tree. Therefore, any set of N prefixes with at most H bits can be compressed in the time complexity of O(N×H).

We now consider the memory complexity to store the compressed prefix tree. Let p denote a page, and String(p) contain P bits. Since there are at most N×H nodes, it requires about X=(3×N×H/P) pages to store the entire tree if the depth-1 numbering is employed. Since there are total N prefixes, it requires about $\log_2$ N bits for NextHopPtr(p). Since there are X pages, it requires about $\log_2$ X bits for NextPagePtr(p). So, each page requires (P+$\log_2$ N+$\log_2$ X) bits. Therefore, it requires M=X(P+$\log_2$ N+$\log_2$ X) to store the entire compressed prefix tree. Suppose N is much larger than H, and P is much larger than $\log_2$ N. We have M=3×N×H.

We now consider the time complexity to perform each prefix search when the compress tree search technique is employed. The time complexity of a prefix search is defined as the number of pages been accessed during any give prefix search. Recall that using depth-1 numbering requires 3 bits for each node in the prefix tree. Since we take the in-order breath-first numbering to construct each page, it requires $P=3(2^{h-1}-1)$ bits to store a tree of depth h in the worst case, i.e. a complete binary tree of depth h. Suppose a page contains at least one egress node. Then, the depth from the root node of this subtree to any egress node of this page has a depth at least $H=\lfloor \log_2 \{2(P+1)/3\} \rfloor$. Given a string of length S, it requires accessing at most $\lceil (S+1)/H \rceil$ pages to find the longest prefix match of this string among all prefixes stored in the prefix tree.

Now consider the IPv4 addresses. Note that each IPv4 address is a 32-bit string. That is S=32. Suppose each page contains P=64 bits. We have H=5. Therefore, it requires accessing at most $\lceil 33/5 \rceil$=7 pages to find the longest prefix match. We can further reduce the number of accessed pages by introducing a hash function as in the Hashed Radix Tree to handle the first F=16 bits of each address. Then, in the worst cast, it would require accessing only $\lceil (33-F)/5 \rceil$+1=5 pages to find the longest prefix match for any IPv4 address.

Algorithm for IPv4 Addresses

We shall describe tree compression and search algorithms supporting IPv4 addresses. This algorithm only access memory four times to find the longest prefix for any IPv4 address, which is independent of the number prefixes stored in the tree structure. The prefix tree is partitioned into two levels as in the Hashed Radix Tree. Let the first level be a RAM of 128K entries. Each entry in the table denotes there is a subtree with the corresponding first 17 bits, and this entry is an index to identify a subtree. The subtrees in the second level are organized into pages. Each page p consists of three fields a 45-bit String(p), a 19-bit NextPagePtr(p), and a 16-bit NextHopPtr(p). Then, the Prefix Tree Compression Algorithm is employed to compress each subtree. It follows the result from the previous section that each 45-bit String(p) contains a subtree of at least depth 5. Therefore, the algorithm accesses only three pages to traverse a subtree of depth 15 in the worst case. During the search of these three pages, only two fileds String(p) and NextPagePtr(p) of each page p are accessed. The field NextHopPtr(p) is only accessed after the longest prefix match is found. Therefore, only four memory accesses are required to find the longest prefix match in the worst case, regardless the number searched prefixes.

Now consider the memory requirement to support a 128K-entry routing table. We shall only consider the memory requirement of the tree structure, but not the next-hop information associated with each route. Suppose each entry of the 128K-entry array contains a 20-bit pointer. Then, the first-level array requires 320K bytes. Each page consists of (45+19+16)/8=10 bytes. It follows from the calculation in the previous section that the compressed tree structure contains about (3×128K×32)/45≈273K pages. Therefore, the total memory requirement to support a 128K-entry routing table is 320K+10×273K≈3M bytes.

Optimal Numbering without Statistical Information

Instead of using the depth-1 numbering, one can also assign a unique number to any subtrees consisting of at most K nodes, where we can consider the depth-1 numbering is equivalent to let K equal to 1. The following discussion considers the memory requirement to represent any subtree with at most K nodes. Suppose the number of feasible subtrees with at most K nodes is F(K). Then at least one of these subtrees requires $\lceil \log_2 F(K) \rceil$ bits to represent.

Figure 8:
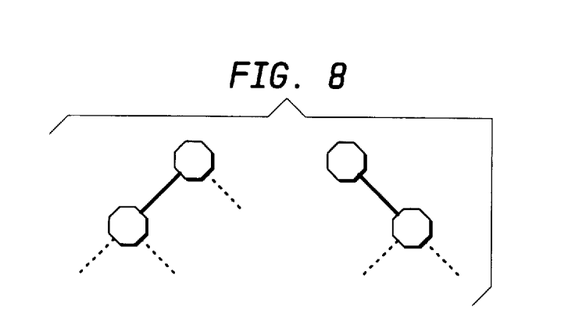
FIG. 8 illustrates an alternative method identifying subtrees each having K=2 nodes.

For example, let us compute the number of feasible subtrees (under the in-order breadth-first numbering) with at most two nodes. The only possible arrangement of subtrees with 2 nodes is shown in FIG. 8. Each dashed line indicates the corresponding node either has a descendent or not. Each node in the figure can be either in gray or white color. So, the number of feasible subtrees with 2 nodes is $2^2 \times (2^3+2^2)$=48. Since there are total 7 different subtrees with one node as shown in FIG. 4, the total number of feasible subtrees with at most 2 nodes is 55. Among these subtrees with at most two nodes, at least one of them requires $\lceil \log_2 55 \rceil$=6 bits to represent.

One can similarly show that the number of feasible subtrees with at most three nodes is 311. Among these subtrees with at most three nodes, at least one of them requires $\lceil \log_2 311 \rceil$=9 bits to represent.

It follows from the definition of the depth-1 numbering that it would requires 3K bits to represent any tree with at most K nodes. Then, we have shown that the depth-1 numbering is an optimal numbering method for small trees with at most 3 nodes. We shall derive the lower bound on the number of feasible trees with at most K nodes, where K is much greater than 3. Let G(K) denote the number of feasible trees with K nodes. It is easy to show that G(1)=1, G(2)=2, and G(3)=5. For any K greater than 3, it is clear that:

$$G(K) = \sum_{i=0}^{K-1} G(i) \times G(K-i-1) \geq 2 \times G(K-1) + 2 \times G(K-2).$$

By solving the above inequality with the initial conditions G(2)=2 and G(3)=5, one can show that for any K greater than 3, we have $$G(K) \geq \frac{(1+\sqrt{3})^K + (1-\sqrt{3})^K}{4}.$$

Consider any feasible subtree T with K nodes. Each node of T can be in gray color or in white color, independent of the assignment of other nodes in the tree. Moreover, it is clear that at least a leaf node in T has two descendents. Recall that F(K) denote the number of feasible subtrees with at most K nodes. We have $$F(K) \geq \sum_{i=1}^{K} 2^{i+2} \times G(i) \geq \sum_{i=1}^{K} 2^i (1+\sqrt{3})^i + \sum_{i=1}^{K} 2^i (1-\sqrt{3})^i.$$

By summing up the right hand side of the above inequality and assuming K is large, we have the following loose lower bound on F(K):

$$F(K) \geq \frac{(5+\sqrt{3})}{11} 2^{K+1} \times (1+\sqrt{3})^K.$$

Then, among all subtrees with at most K nodes, at least one of them requires $\lceil \log_2 F(K) \rceil$ bits to represent.

$\log_2 F(K) \geq 2.45 \times K.$

Comparing with the 3K-bit requirement when using the depth-1 numbering, it implies that the depth-1 numbering is almost optimal when K is large.

Optimal Numbering with Statistical Information

The technique introduced in the prior sections of this paper assumes no knowledge on the prefix tree structure. In fact, we assume that every subtree of FIG. 4 exists with equal probability in any given prefix tree. With additional knowledge, one can compress a prefix tree more efficiently than the result presented here. For example, if we know the statistical distribution of all subtrees in a given prefix tree, we can obtain an optimal numbering of all subtrees based on the technique similar to the Huffman-coding. It is easy to show that the resulting binary representation of this prefix tree is also optimal.

Figure 9:
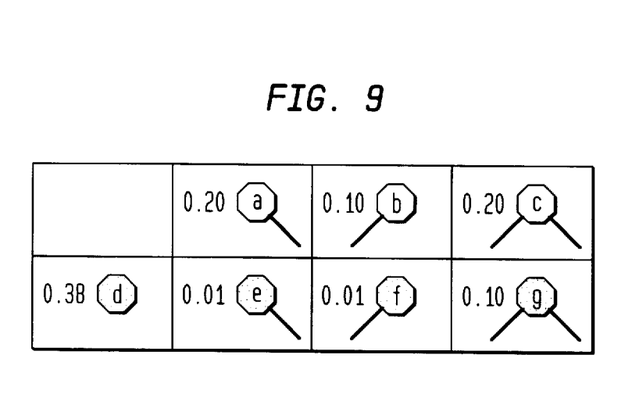
FIG. 9 depicts the subtrees of FIG. 4 identified according to their probability of distribution.
Figure 10:
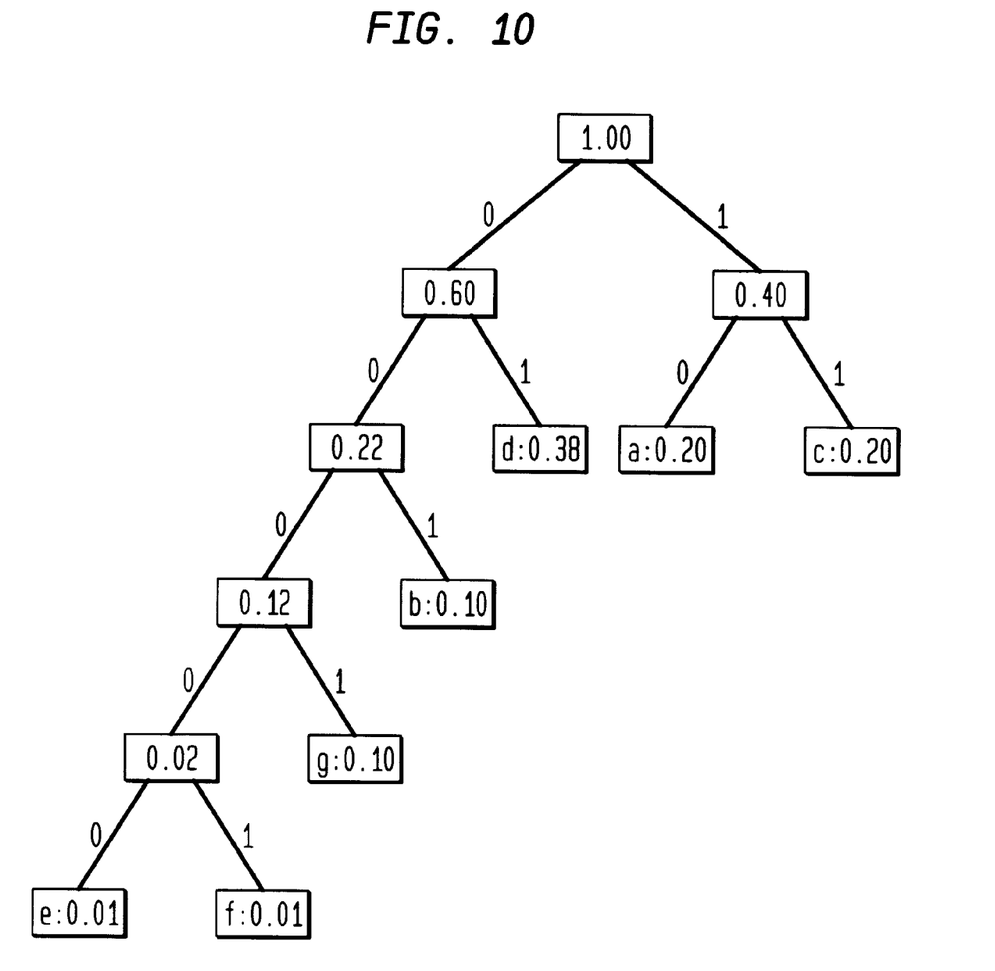
FIG. 10 illustrates a Huffman-coded representation of the prefix tree of FIG. 3 identified according the probability distribution of FIG. 9.

For example, suppose we know that the statistical distribution of all subtrees of depth-1, and the probability distribution is shown in FIG. 9. Each depth-1 subtree is identified by a symbol in the figure. Based on the probability distribution of all depth-1 subtrees, the Huffman code assigned to each subtree is illustrated in FIG. 9. The path from the root node to the corresponding leaf node indicates the binary representation of each subtree. For example, the binary strings 10 and 00001 represent the subtrees 'a' and 'f', respectively.

Using the Huffman coding and the in-order depth-first numbering, we can represent the prefix tree illustrated in with the following binary string: 11-0001-01-11-10-01-01-001-10-01, which contains 23 bits. Recall that the depth-1 numbering scheme illustrated in FIG. 3 requires 30 bits to represent the same prefix tree, containing 10 nodes and each node requires 3 bits. Suppose fixed-size pages are employed to encode the same prefix tree. The Huffman coding scheme only requires three 8-bit pages to represent the prefix tree versus the four 9-bit pages employed by the depth-1 numbering of FIG. 4, see FIG. 6. Although the Huffman coding can reduce the memory requirement to represent a prefix tree, it also requires certain amount of memory to store the mapping between subtrees and corresponding binary strings, which usually is not a trivial mapping compared to the depth-1 numbering illustrated in FIG. 4. Moreover, either off-line or on-line measurement is required to obtain the statistical distribution of subtrees to take advantages of the Huffman coding scheme.

What has been described is deemed to be illustrative of the principles of the invention. Further and other embodiments will be apparent to those skilled in the art without, however, departing from the spirit and scope of the invention.

What is claimed is:

1. A method for searching a routing table for routes corresponding to an input string derived from an internet protocol prefix, comprising:

a) fetching a compressed tree of pages in memory corresponding to internet protocol address prefixes according to a code which identifies whether a node (i) represents a valid prefix; (ii) has descendent nodes; and (iii) is a descendent node corresponding to a 1 or to a zero in a predetermined bit position of the prefix;

b) decompressing the fetched page to construct the original prefix tree; and c) searching the decompressed tree to identify the longest prefix matching said string.

2. A method of compressing a prefix tree to reduce the number of memory accesses required to look up the interface corresponding to a prefix of an Internet Protocol address, comprising:

a) assigning to an array of pages in memory a string of codes to identify an ordered selection of prefix tree nodes; said selection comprising a subtree beginning at the root node of the prefix tree and including nodes having a predetermined order of descent from said root until all nodes rooted at said root node have been included;

b) associating with a first page of said array a pointer to a subsequent page containing a string of codes to identify a similarly ordered selection of the remaining nodes of said prefix tree beginning at a descendent of an egress node of said subtree;

c) associating with said first page of said array a pointer to the interface information corresponding to the first valid prefix stored in said first page; and d) repeating steps (b) and (c) for each remaining page of said array.

3. A method according to claim 2 wherein said pages are equal size pages.

4. A method according to claim 3 wherein said ordered selection selects the nodes having an equal degree of descent ("In-Order, Breadth-First") from said root node before selecting any node of more remote degree.

5. A method according to claim 3 wherein said ordered selection selects the nodes identified by a particular bit value and having successively increasing degree of remoteness ("In-Order, Depth-First") from said root node before selecting any node identified by a different bit value.

6. A method of compressing a prefix tree to reduce the number of memory accesses required to look up the interface corresponding to a prefix of an Internet Protocol address, comprising:

a) assigning to an array of pages in memory a string of codes to identify an ordered selection of prefix tree nodes; said selection comprising a subtree beginning at the root node of the prefix tree and including nodes having a predetermined order of descent from said root node until said page is filled or until all nodes rooted at said root node have been included; wherein each of said nodes in said selection has no more than two descendents and wherein each such code identifies whether a node (i) represents a valid prefix; (ii) has descendent nodes; and (iii) is a descendent node corresponding to a 1 or to a zero in a predetermined bit position of the prefix;

b) associating with a first page of said array a pointer to a subsequent page containing a string of codes to identify a similarly ordered selection of the remaining nodes of said prefix tree beginning at a descendent of an egress node of said subtree;

c) associating with said first page of said array a pointer to the interface information corresponding to the first valid prefix stored in said first page; and d) repeating steps (b) and (c) for each remaining page of said array.

7. A method according to claim 3 wherein said pointer to the next page is incremented according to the number of the subtree's immediate external descendents and wherein said pointer to said interface information is incremented by the number of the subtree's valid prefixes.

8. A method according to claim 4 wherein said interface information is stored in an array.

9. A prefix tree rapidly searchable for interface information corresponding to a prefix of an Internet Protocol address, comprising:

a) a memory having an array of pages each comprising a subtree beginning at a root node; said subtree including a bit string identifying whether each node thereof (i) represents a valid prefix; (ii) has descendent nodes; and (iii) which descendent node, if present, corresponds to a 1 or to a zero in a predetermined bit position of the prefix;

b) a first pointer associated with each such page pointing to a subsequent page of said array containing a string of codes to identify a similarly ordered selection of the remaining nodes of said prefix tree beginning at a descendent of an egress node of said subtree; and c) a second pointer associated with said page pointing to interface information corresponding to the first valid prefix stored in said first page.

10. A method for searching a routing table for routes corresponding to an input string derived from an internet protocol prefix, comprising:

a) decompressing a compressed tree page containing an ordered selection of prefix tree nodes corresponding to internet protocol address prefixes pursuant to a code which identifies whether each of said nodes (i) represents a valid prefix, (ii) has descendant nodes and is a descendent node corresponding to a "1" or to a "0" in a predetermined bit position of the prefix; and b) searching the decompressed tree to identify the longest prefix matching said string.

* * * * *